United States Patent
Kim et al.

(10) Patent No.: US 11,466,867 B2
(45) Date of Patent: Oct. 11, 2022

(54) OVEN

(71) Applicant: Samsung Electronics Co., Ltd., Suwon-si (KR)

(72) Inventors: Tae Hun Kim, Suwon-si (KR); Hyun Sang Kim, Suwon-si (KR); Bok Hyun Jang, Suwon-si (KR); Yu Jeub Ha, Suwon-si (KR); Qasim Khan, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 16/720,869

(22) Filed: Dec. 19, 2019

(65) Prior Publication Data

US 2020/0200396 A1    Jun. 25, 2020

(30) Foreign Application Priority Data

Dec. 19, 2018    (KR) .................. 10-2018-0165195

(51) Int. Cl.
*F24C 15/32*    (2006.01)
*F24C 14/02*    (2006.01)
(Continued)

(52) U.S. Cl.
CPC .............. *F24C 15/322* (2013.01); *A21B 1/26* (2013.01); *A21B 3/02* (2013.01); *A47J 27/002* (2013.01);
(Continued)

(58) Field of Classification Search
CPC ........ F24C 14/00; F24C 14/02; F24C 14/025; F24C 3/087; F24C 15/08; F24C 15/007; F24C 15/32
See application file for complete search history.

(56) References Cited

U.S. PATENT DOCUMENTS 1,717,222 A * 6/1929 Kahn ................... F24C 15/32
126/19 R
1,726,735 A * 9/1929 Firestone ............. F24C 15/32
126/275 R
(Continued)

FOREIGN PATENT DOCUMENTS

CN    203634029 U   *  6/2014
DE        535180       4/1941
(Continued)

OTHER PUBLICATIONS

International Search Report dated Apr. 17, 2020 in International Patent Application No. PCT/KR2019/017819.
(Continued)

*Primary Examiner* — Jorge A Pereiro
(74) *Attorney, Agent, or Firm* — Staas & Halsey LLP (57) ABSTRACT

An oven with an enhanced structure to keep a cooking space clean includes a main body, a cooking chamber formed inside the main body and including a bottom wall, a burner provided at an outer lower part of the cooking chamber to heat up the cooking chamber, a door arranged to open or close the cooking chamber, a bottom plate coupled to the bottom wall of the cooking chamber with a gap from the bottom wall such that the bottom plate is located inside the cooking chamber, and an outlet for heated air formed between one end of the bottom plate facing the door and the bottom wall of the cooking chamber such that heated air generated from the burner is supplied to the door.

17 Claims, 9 Drawing Sheets

(51) Int. Cl.
*F24C 3/08* (2006.01)
*A21B 1/26* (2006.01)
*F24C 14/00* (2006.01)
*A47J 27/00* (2006.01)
*F24C 15/02* (2006.01)
*A21B 3/02* (2006.01)

(52) U.S. Cl.
CPC .............. *F24C 3/087* (2013.01); *F24C 14/00* (2013.01); *F24C 14/025* (2013.01); *F24C 15/02* (2013.01)

(56) References Cited

U.S. PATENT DOCUMENTS

| | | | | |
|---|---|---|---|---|
| 2,064,714 A | * | 12/1936 | Antrim | F24C 3/087 126/39 E |
| 2,164,079 A | * | 6/1939 | Parker | F24C 3/087 126/41 R |
| 2,207,358 A | * | 7/1940 | Rogers | F24C 15/32 126/19 R |
| 2,498,554 A | * | 2/1950 | Klein | F24C 15/08 312/265.6 |
| 2,796,060 A | * | 6/1957 | Binns | F24C 3/027 126/273 R |
| 3,120,224 A | * | 2/1964 | Divelbiss | F24C 15/007 126/39 M |
| 3,507,265 A | * | 4/1970 | Dills | F24C 14/025 126/21 R |
| 3,587,557 A | * | 6/1971 | Henderson | F28D 21/0003 126/21 A |
| 3,783,854 A | * | 1/1974 | Hurko | F24C 14/025 126/21 R |
| 4,796,600 A | | 1/1989 | Hurley et al. | |
| 5,038,748 A | | 8/1991 | Lockwood et al. | |
| 8,272,321 B1 | * | 9/2012 | Kalsi | A47J 37/041 99/421 H |
| 2005/0006382 A1 | | 1/2005 | Hayakawa et al. | |
| 2011/0139142 A1 | * | 6/2011 | Schalueck | F24C 3/087 126/39 E |
| 2015/0101592 A1 | * | 4/2015 | Cadima | F24C 3/087 126/41 R |
| 2015/0192307 A1 | * | 7/2015 | Paller | F24C 3/087 126/273 R |
| 2017/0016617 A1 | * | 1/2017 | Paller | F24C 3/087 |
| 2018/0003390 A1 | * | 1/2018 | Trice | F24C 15/04 |

FOREIGN PATENT DOCUMENTS

| | | |
|---|---|---|
| FR | 2 884 595 | 10/2006 |
| KR | 20030086080 A * | 11/2003 |
| KR | 10-2004-0067380 | 7/2004 |
| KR | 10-2006-0013765 | 2/2006 |
| KR | 10-2006-0082253 | 7/2006 |
| KR | 10-2009-0085965 | 8/2009 |
| KR | 10-2010-0013997 | 2/2010 |

OTHER PUBLICATIONS

Extended European Search Report dated Oct. 29, 2021, in European Application No. 19 89 9335.4 (9 pages).

* cited by examiner

OVEN

CROSS-REFERENCE TO RELATED APPLICATION(S)

This application is based on and claims priority under 35 U.S.C. § 119 to Korean Patent Application No. 10-2018-0165195, filed on Dec. 19, 2018, in the Korean Intellectual Property Office, the disclosure of which is incorporated by reference herein in its entirety.

BACKGROUND

1. Field

The disclosure relates to ovens, and more particularly, to an oven with an enhanced structure to keep a cooking space clean.

2. Description of Related Art

Ovens are devices typically equipped with a cooking chamber, a heating device for applying heat to the cooking chamber, and a circulation fan for circulating the heat produced by the heating device inside the cooking chamber to cook food.

The ovens may be classified into electric types, gas types, and microwave types. The electric oven uses an electric heater as a heat source, and the gas and microwave ovens use heat from gas and frictional heat of water molecules at high frequencies as heat sources, respectively.

The oven may further include a cooking space defined by the cooking chamber and a door. The cooking space may be contaminated in the process of cooking a material contained therein. In preparation for the contamination, the oven may be equipped with a self-cleaning function.

When the self-cleaning function is performed in the oven, the heating device may heat up the cooking space to a high temperature. In this process, contaminants like food waste in the cooking space may burn, allowing the user to easily clean the cooking space.

Recently, however, the self-cleaning function of the oven has been considered insufficient to clean the inside of the door that defines the cooking space together with the cooking chamber.

SUMMARY

Additional aspects will be set forth in part in the description which follows and, in part, will be apparent from the description, or may be learned by practice of the presented embodiments The disclosure provides an oven with an enhanced structure to maximize the effect of self-cleaning function.

The disclosure also provides an oven with an enhanced structure to keep not only a cooking chamber but also the inside of a door that defines cooking space with the cooking chamber clean.

In accordance with an aspect of the disclosure, an oven includes a main body, a cooking chamber formed inside the main body and including a bottom wall, a burner provided at an outer lower part of the cooking chamber to heat up the cooking chamber, a door arranged to open or close the cooking chamber, a bottom plate coupled to the bottom wall of the cooking chamber with a gap from the bottom wall such that the bottom plate is located inside the cooking chamber, and an outlet for heated air formed between one end of the bottom plate facing the door and the bottom wall of the cooking chamber such that heated air generated from the burner is supplied to the door.

The oven may further include a supporting plate coupled to the bottom wall of the cooking chamber to be located between the bottom plate and the bottom wall, and including a moving hole for heated air formed at one end of the supporting plate toward the door.

The oven may further include a guide bracket arranged between the bottom plate and the supporting plate to guide heated air having passed the moving hole for heated air to the outlet for heated air.

The guide bracket may be coupled to the supporting plate to cover the moving hole for heated air.

The guide bracket may include a first portion directed to the outlet for heated air; a second portion coupled to the supporting plate; and a third portion connecting the first portion to the second portion and including a slope opposite the moving hole for heated air.

The first portion may be located above the second portion in an up and down direction of the cooking chamber.

The slope of the third portion may lean at an angle of approximately 30 degrees or greater and approximately 40 degrees or less from a reference line extending in a front and back direction of the cooking chamber to pass a point of contact between the second portion and the third portion.

A distance between the one end of the bottom plate and the bottom wall of the cooking chamber, which defines the outlet for heated air, may be equal to or greater than approximately 6.9 mm and less than approximately 10 mm in an up and down direction of the cooking chamber.

The supporting plate may include a plurality of moving holes for heated air separately arranged in a left and right direction of the cooking chamber, each of the plurality of moving holes for heated air having long sides extending in the left and right direction of the cooking chamber and short sides extending in a front and back direction of the cooking chamber and connected to the long sides.

The bottom plate may include a plurality of outlets for heated air formed to pass through the bottom plate such that heated air generated from the burner is supplied to the cooking chamber.

The cooking chamber may further include side walls, and the bottom plate may include a bottom plate body at which the plurality of outlets for heated air are formed; and a border part formed along edges of the plurality of outlets for heated air, and extending toward a bottom of the bottom plate from the bottom plate body.

The border part of the bottom plate may include a first border part adjacent to the side walls of the cooking chamber and including an upper end directed to a top of the bottom plate and a lower end directed to a bottom of the bottom plate; and a second border part, which is opposite the first border part and lower in height than the first border part in an up and down direction of the cooking chamber.

The first border part may include a slope leaning to inside of the bottom plate from a reference line extending in the up and down direction of the cooking chamber to pass the upper end of the first border part.

The oven may further include a burner accommodation chamber located under the cooking chamber to accommodate the burner, and the burner may include a first pipe arranged to be adjacent to one of side walls of the burner accommodation chamber; a second pipe arranged to be adjacent to the other one of side walls of the burner accommodation chamber to be opposite the first pipe; and a third pipe arranged to face the door and connecting the first pipe to the second pipe. Each of the first and second pipes may have a plurality of first discharge holes formed thereon for heated air generated from the burner to be supplied to the side walls of the cooking chamber through the plurality of outlets for heated air, and the third pipe may have a plurality of second discharge holes formed thereon for heated air generated from the burner to be supplied to the door through the outlet for heated air.

The plurality of second discharge holes may be smaller in size than the plurality of first discharge holes.

In accordance with an aspect of the disclosure, an oven may include a main body; a cooking chamber formed inside the main body with the front open and including a bottom wall; a door arranged to open or close the front of the cooking chamber; a bottom plate coupled to the bottom wall of the cooking chamber with a gap from the bottom wall such that the bottom plate is located inside the cooking chamber; a burner provided at an outer lower part of the cooking chamber to heat up the cooking chamber, and including a pipe extending in a left and right direction of the cooking chamber to face the front of the cooking chamber and including a plurality of discharge holes; and a heated air path arranged for heated air generated from the burner to be discharged to the front of the cooking chamber through the plurality of discharge holes and supplied to the door.

The oven may further include an outlet for heated air formed between a front end of the bottom plate and a front end of the bottom wall of the cooking chamber and located in the heated air path.

The oven may further include a supporting plate coupled to the bottom wall of the cooking chamber to be located between the bottom plate and the bottom wall and including a moving hole for heated air formed at one end of the supporting plate toward the front of the cooking chamber, and the moving hole for heated air may be located in the heated air path.

The oven may further include a guide bracket arranged between the bottom plate and the supporting plate to form a portion of the heated air path with at least one of the supporting plate and the bottom wall of the cooking chamber.

The guide bracket may include a first portion directed to the front of the cooking chamber; a second portion directed to a back of the cooking chamber and coupled to the supporting plate; and a third portion connecting the first portion to the second portion and including a slope opposite the moving hole for heated air.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. The terms "front", "rear", "upper", "lower", "top", and "bottom" as herein used are defined with respect to the drawings, but the terms may not restrict the shape and position of the respective components.

Hereinafter, 'X' denotes a front and back direction of a cooking chamber 20, 'Y' denotes a left and right direction (or horizontal direction) of the cooking chamber 20, and 'Z' an up and down direction (or vertical direction) of the cooking chamber 20.

Figure 1:
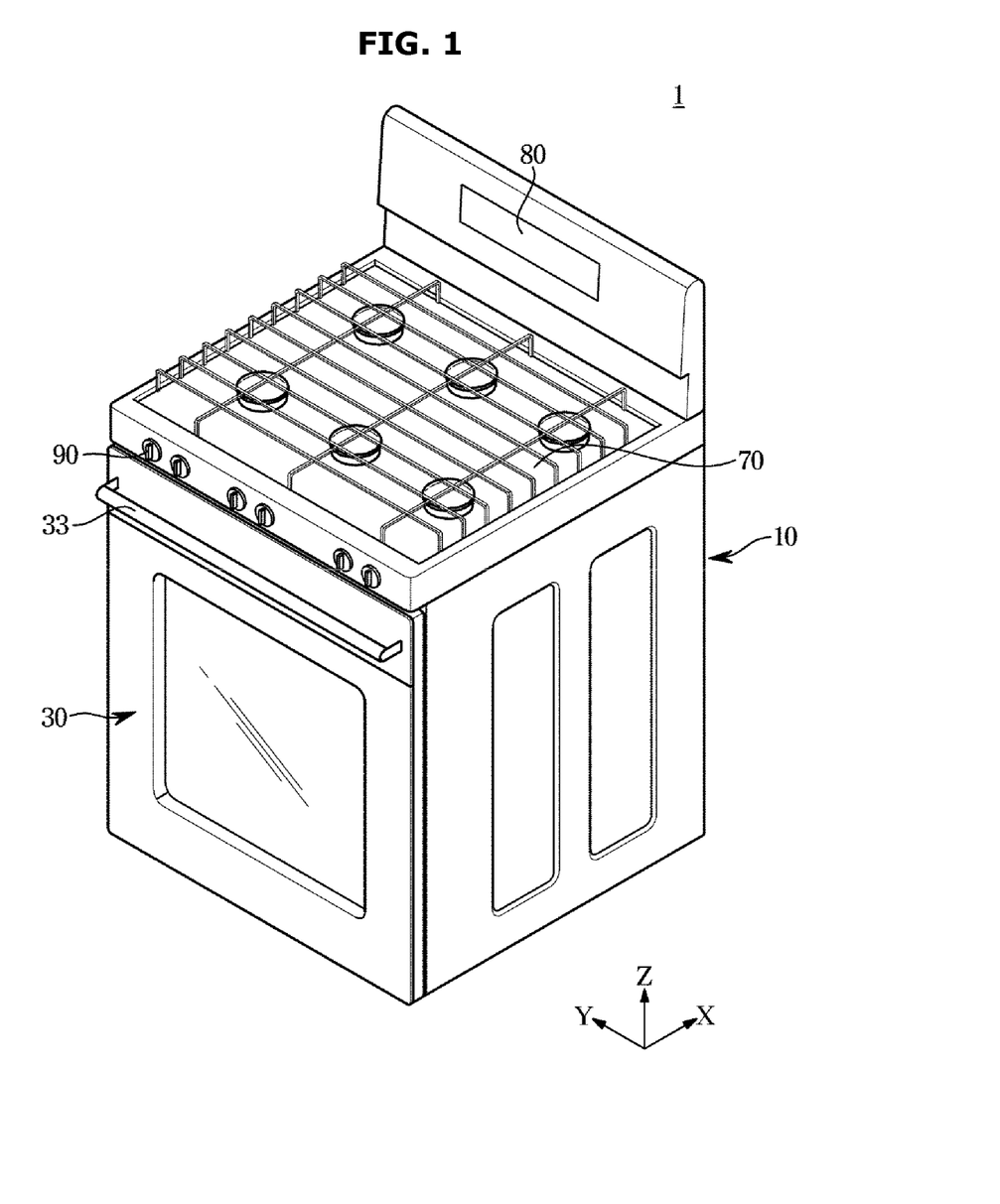
FIG. 1 is a perspective view of an oven, according to an embodiment of the disclosure.
Figure 2:
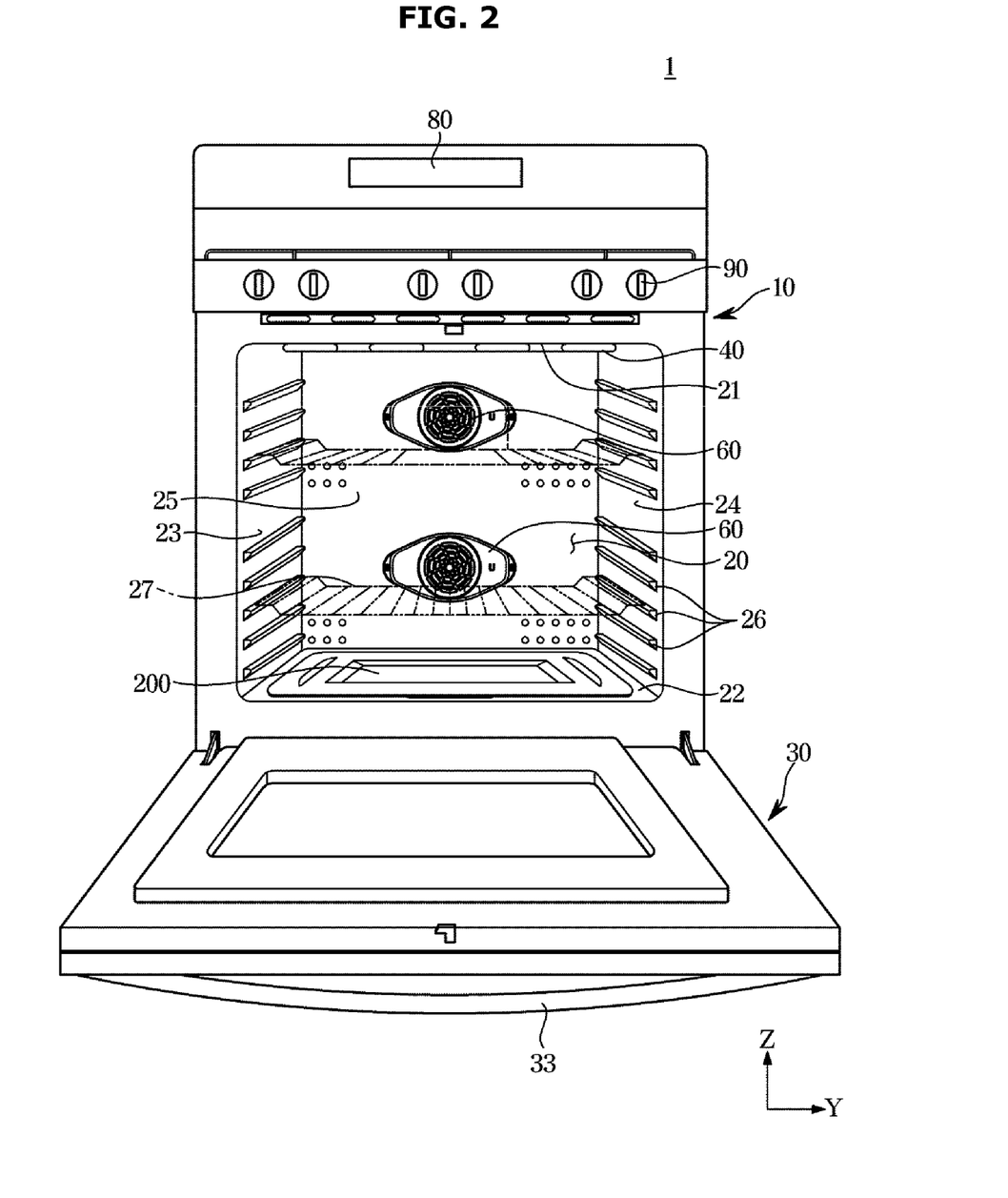
FIG. 2 shows an oven with a door open, according to an embodiment of the disclosure.

FIG. 1 is a perspective view of an oven, according to an embodiment of the disclosure, and FIG. 2 shows an oven with an open door, according to an embodiment of the disclosure.

As shown in FIGS. 1 and 2, an oven 1 may include a main body 10 that forms the external appearance, the cooking chamber 20 formed inside the main body 10, a door 30 arranged to open or close the cooking chamber 20, a plurality of burners 40 and 50 arranged to heat the cooking chamber 20, and a plurality of convection fans 60 arranged to circulate air in the cooking chamber 20.

The cooking chamber 20 may have the form of almost an open front box. Specifically, the cooking chamber 20 may include a top wall 21, a bottom wall 22, side walls 23 and 24, and a rear wall 25. The side walls 23 and 24 may include left and right walls 23 and 24. The open front of the cooking chamber 20 may be opened or closed by the door 30. The door 30 may be pivotally mounted at the main body 10 to open or close the open front of the cooking chamber 20. For example, the door 30 may be pivotally hinged to the main body 10 to open or close the open front of the cooking chamber 20 in the up and down direction Z of the cooking chamber 20. A handle 33 may be mounted on the door 30 for the convenience of users.

A cooktop 70 for allowing a container with a material to be cooked therein to be placed thereon and heating the container, a display 80 for displaying various operational information of the oven 1, and a control part 90 for controlling operation of the oven 1 may be provided on the top of the main body 10.

A plurality of supporters 26 may be provided inside the cooking chamber 20. Specifically, the plurality of supporters 26 may be arranged on the side walls 23 and 24 of the cooking chamber 20. Racks 27 may be mounted on the plurality of supporters 26 to put a material to be cooked thereon.

A divider (not shown) may be detachably mounted on the plurality of supporters 26 to divide the cooking chamber 20 into multiple cooking sections. The multiple cooking sections obtained by dividing the cooking chamber 20 may not necessarily be equal but may be different in size. The divider may be formed of an insulating material to insulate the multiple cooking sections. The divider may make better use of the space of the cooking chamber 20.

The plurality of burners 40 and 50 may generate heat by burning gas. In this regard, the burners 40 and 50 may be gas burners. The burners 40 and 50 may include a first burner 40 installed inside the cooking chamber 20 and a second burner 50 installed outside the cooking chamber 20 (see FIG. 3). The first burner 40 may be installed on the top wall 21 of the cooking chamber 20. The first burner 40 may be referred to as a broil burner, which may directly heat up the material to be cooked inside the cooking chamber 20 by flames generated by burning gas. The second burner 50 may be arranged at the bottom of the outside of the cooking chamber 20. Specifically, the second burner 50 may be installed in a burner accommodation chamber 100 located under and linked to the cooking chamber 20. The second burner 50 may be referred to as a bake burner, which may indirectly heat up the material to be cooked inside the cooking chamber 20. Specifically, the second burner 50 may heat air inside the burner accommodation chamber 100, and the heated air inside the burner accommodation chamber 100 may flow into the cooking chamber 20 by natural convection and heat up the material in the cooking chamber 20.

Figure 3:
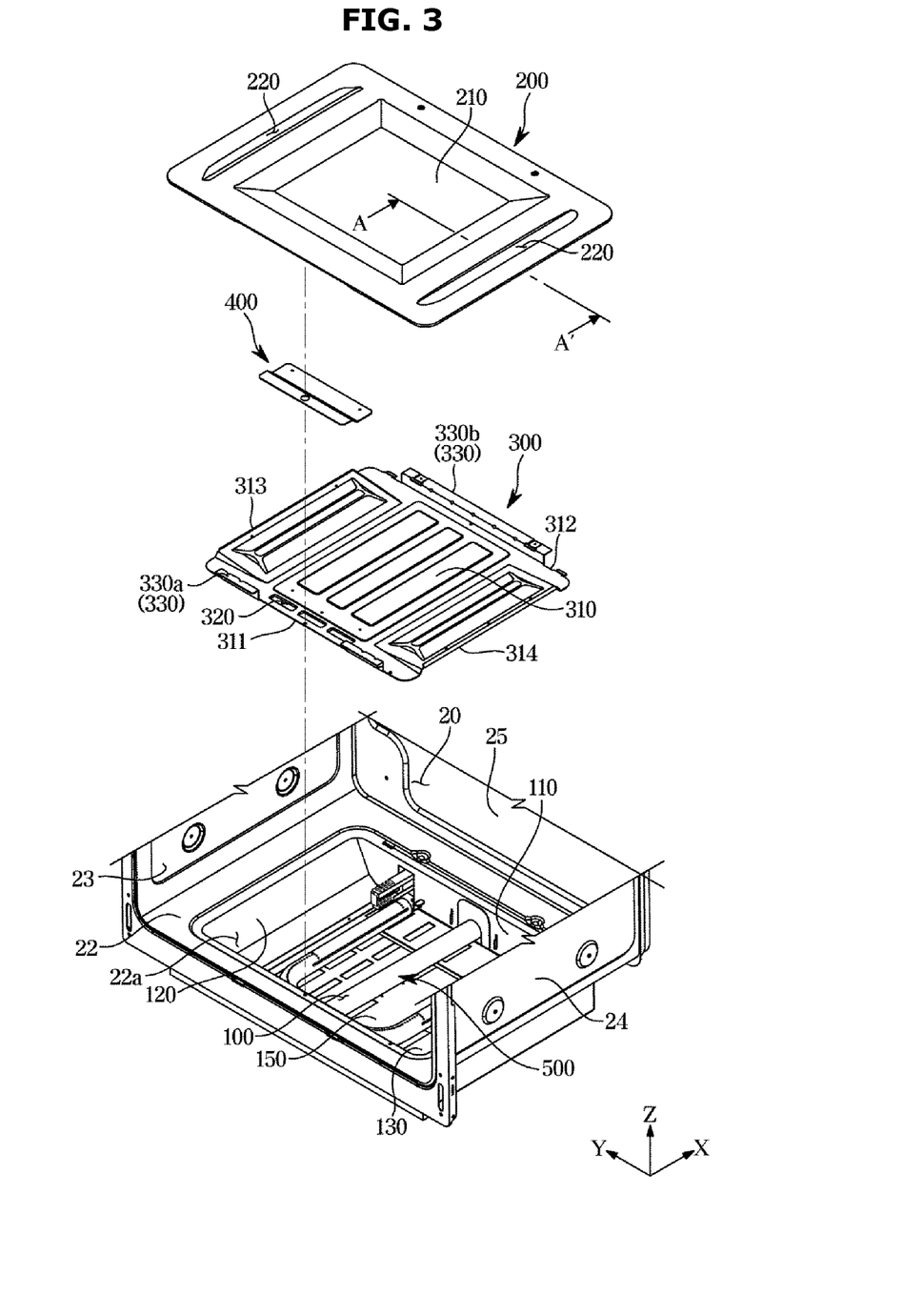
FIG. 3 is an exploded perspective view of an oven, according to an embodiment of the disclosure.

The burner accommodation chamber 100 arranged inside the main body 10 of the oven 1 may be linked to the cooking chamber 20 (see FIG. 3). The burner accommodation chamber 100 may be located under the cooking chamber 20 to accommodate the second burner 50. The cooking chamber 20 and the burner accommodation chamber 100 may be divided by a bottom plate 200 such that they are linked to each other.

The oven 1 may further include the bottom plate 200 coupled to the bottom wall 22 of the cooking chamber 20. The bottom plate 200 may be coupled to the bottom wall 22 of the cooking chamber 20 with such a gap that the bottom plate 200 is located inside the cooking chamber 20. The bottom wall 22 of the cooking chamber 20 may include an opening 22a (see FIG. 3). The bottom plate 200 may be coupled to the bottom wall 22 of the cooking chamber 20 to cover the opening 22a of the bottom wall 22.

The oven 1 may have a self-cleaning function. The self-cleaning function of the oven 1 may burn contaminants inside the cooking chamber 20 by activating the plurality of burners 40 and 50 and heating the cooking chamber 20 to approximately 460° C. to approximately 480° C. to facilitate cleaning of the inside of the cooking chamber 20. As the self-cleaning function is performed in the oven 1, contaminants such as grease spots, food leftovers, etc., which have been spattered on the inner wall of the cooking chamber 20, may be put in a state of being easily removed. The self-cleaning function of the oven 1 is typically focused on cleaning of the cooking chamber 20, so it is inadequate to clean an inside of the door 30 that defines cooking space with the cooking chamber 20. According to the disclosure, to keep not only the cooking chamber 20 but also the inside of the door 30 clean by the self-cleaning function, the oven 1 is modified to have an enhanced structure to allow heated air generated from the second burner 50 to reach to the inside of the door 30. The enhanced structure of the oven 1 to allow the heated air generated from the second burner 50 to reach to the inside of the door 30 will now be described in detail.

Figure 4:
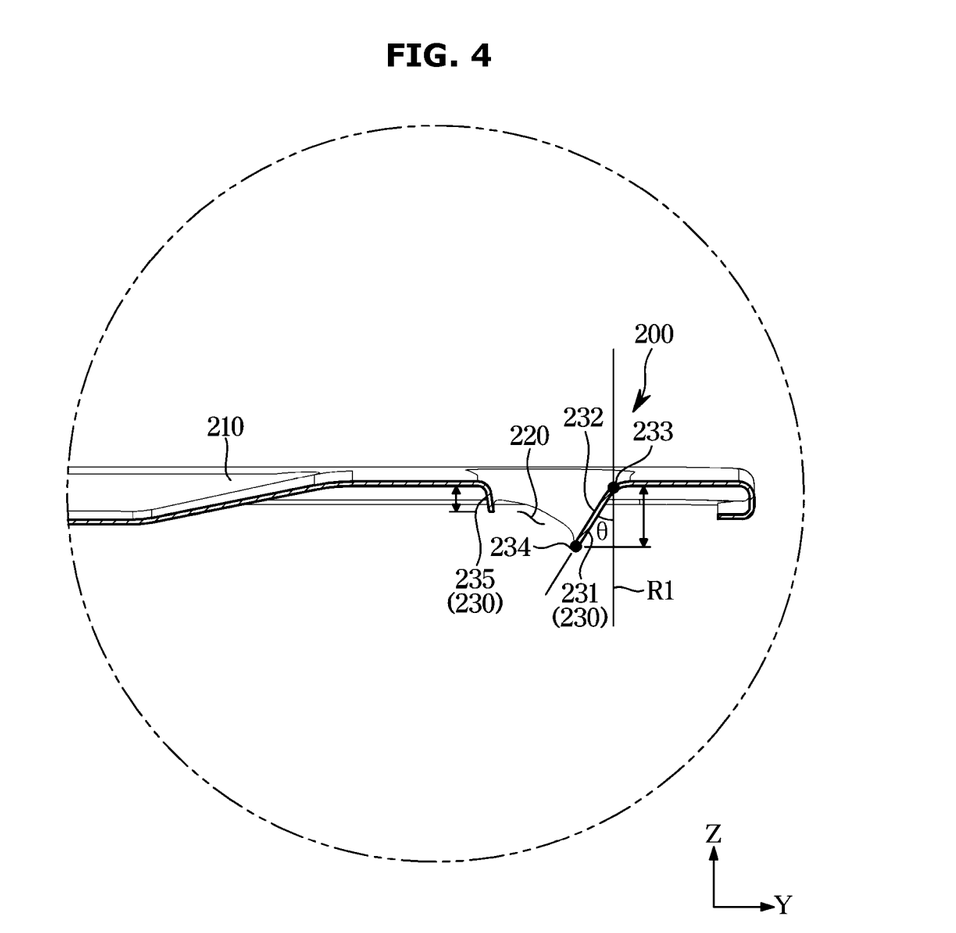
FIG. 4 is a cross-sectional view of a bottom plate of an oven, according to an embodiment of the disclosure.
Figure 5:
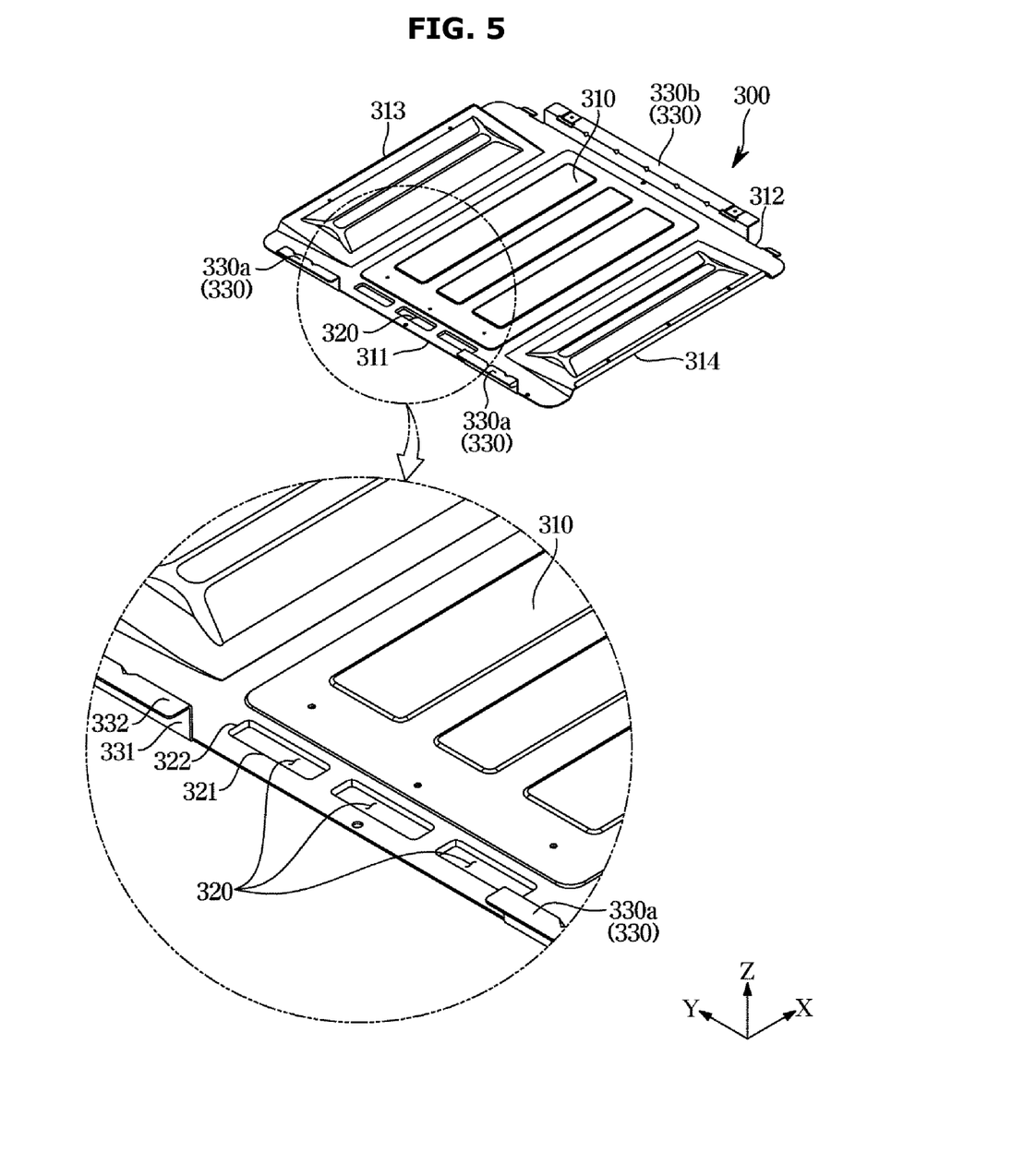
FIG. 5 is an enlarged view of a supporting plate of an oven, according to an embodiment of the disclosure.
Figure 6:
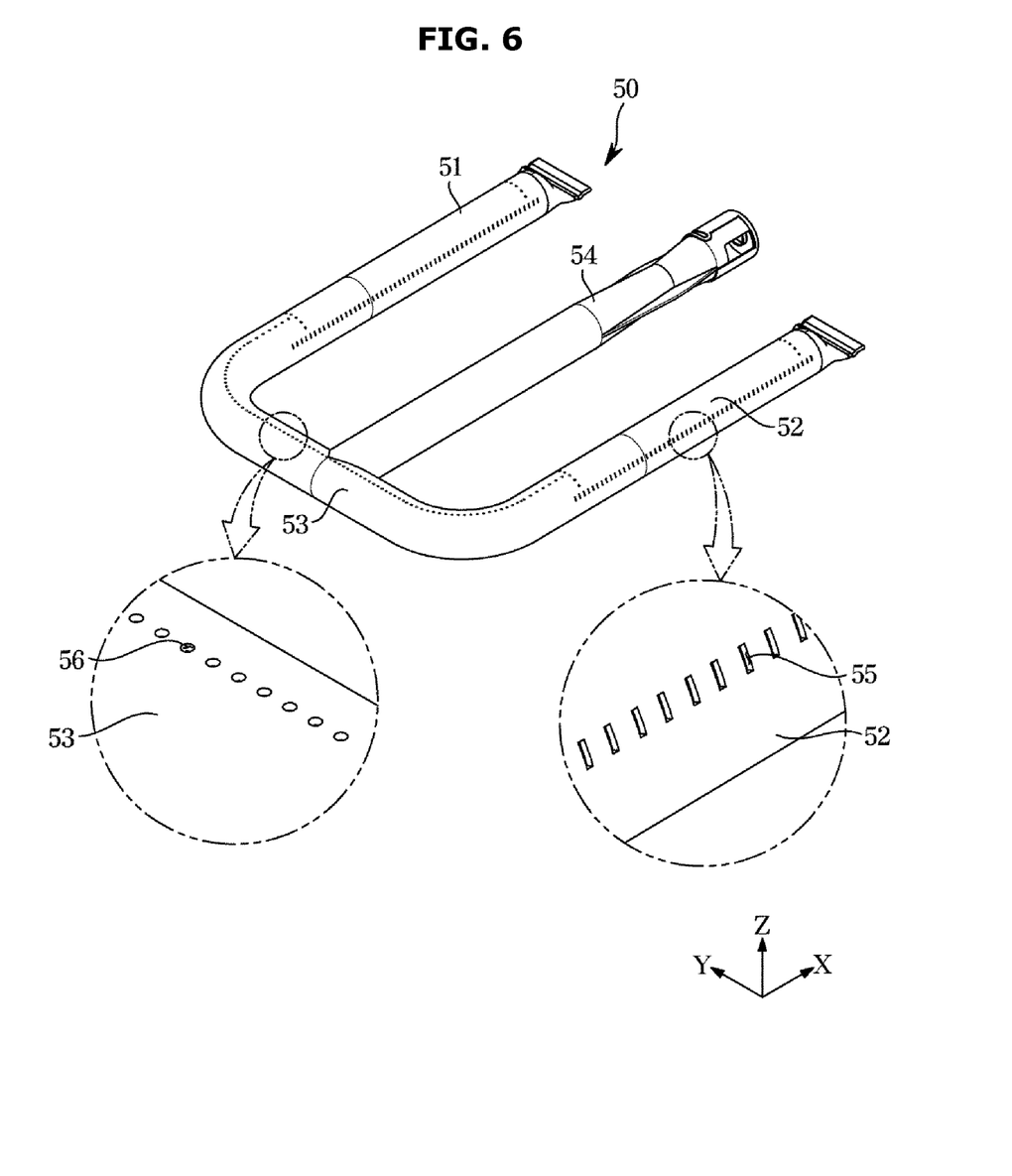
FIG. 6 is an enlarged view of a second burner of an oven, according to an embodiment of the disclosure.

FIG. 3 is an exploded perspective view of an oven, according to an embodiment of the disclosure, and FIG. 4 is a cross-sectional view of a bottom plate of an oven, according to an embodiment of the disclosure. FIG. 5 is an enlarged view of a supporting plate of an oven, according to an embodiment of the disclosure, and FIG. 6 is an enlarged view of a second burner of an oven, according to an embodiment of the disclosure. FIG. 4 is a cross-sectional view of the bottom plate 200 of FIG. 3 cut along A-A'.

As shown in FIGS. 3 to 6, the oven 1 may further include the bottom plate 200.

The bottom plate 200 may include a bottom plate body 210 with a plurality of outlets for heated air 220. The bottom plate body 210 may be fixed to the bottom wall 22 of the cooking chamber 20 to cover the opening 22a of the bottom wall 22.

The plurality of outlets for heated air 220 may be formed at the bottom plate body 210 to be adjacent to the side walls 23 and 24 of the cooking chamber 20. The plurality of outlets for heated air 220 may be formed to pass through the bottom plate body 210 for the heated air generated from the second burner 50 to be supplied to the cooking chamber 20. The plurality of outlets for heated air 220 may have the form of slits that extend in the front and back direction X of the cooking chamber 20. The heated air generated from the second burner 50 may be moved into the cooking chamber 20 through the plurality of outlets for heated air 220 formed at the bottom plate body 210. Specifically, some of the heated air generated from the second burner 50 may be moved into the cooking chamber 20 through one of the plurality of outlets for heated air 220 that is formed near the left wall 23 of the cooking chamber 20, and may burn the contaminants spattered on the left wall 23 of the cooking chamber 20. Some other heated air generated from the second burner 50 may be moved into the cooking chamber 20 through the other of the plurality of outlets for heated air 220 that is formed near the right wall 24 of the cooking chamber 20, and may burn the contaminants spattered on the right wall 24 of the cooking chamber 20.

The bottom plate 200 may further include a border part 230 formed to define the plurality of outlets for heated air 220. The border part 230 may be formed along the edges of the plurality of outlets for heated air 220 and may extend toward a bottom of the bottom plate 200 from the bottom plate body 210.

The border part 230 of the bottom plate 200 may include a first border part 231 adjacent to the side walls 23 and 24 of the cooking chamber 20, and a second border part 235 that is opposite the first border part 231 and located further inside the bottom plate body 210 than the first border part 231. The first and second border parts 231 and 232 may have different heights in the up and down direction Z of the cooking chamber 20. Specifically, the first border part 231 may be higher than the second border part 235 in the up and down direction Z of the cooking chamber 20.

The first border part 231 of the bottom plate 200 may include a slope 232. Specifically, the first border part 231 may include an upper end 233 directed up the bottom plate 200 and a lower end 234 directed down the bottom plate 200. The slope 232 of the first border part 231 may be inclined to the inner side of the bottom plate 200 from a reference line R1 that extends in the up and down direction Z of the cooking chamber 20 to pass the upper end 233 of the first border part 231. In other words, the lower end 234 of the first border part 231 may be located further inside the bottom plate 200 than the upper end 233 of the first border part 231. The slope 232 of the first border part 231 may guide the heated air generated from the second burner 50 to the side walls 23 and 24 of the cooking chamber 20.

The oven 1 may further include a supporting plate 300. The supporting plate 300 may be coupled to the bottom wall 22 of the cooking chamber 200 such that it may be located between the bottom plate 200 and the bottom wall 22 of the cooking chamber 20. Specifically, the supporting plate 300 may be coupled to the bottom wall 22 of the cooking chamber 20 to cover a portion of the opening 22a of the cooking chamber 20, and the bottom plate 200 may be coupled to the bottom wall 22 of the cooking chamber 20 to cover the supporting plate 300 and the opening 22a of the cooking chamber 20.

The supporting plate 300 may include a supporting plate body 310. The supporting plate body 310 may be smaller in size than the opening 22a of the cooking chamber 20 to cover a portion of the opening 22a of the cooking chamber 20. Specifically, the supporting plate body 310 may be smaller in width than the opening 22a of the cooking chamber 20 in the left and right direction Y of the cooking chamber 20 to cover a portion of the opening 22a of the cooking chamber 20.

The supporting plate body 310 may include a front edge 311 facing the front of the cooking chamber 20, a rear edge 312 facing the back of the cooking chamber 20, a left edge 313 facing the left wall 23 of the cooking chamber 20, and a right edge 314 facing the right wall 24 of the cooking chamber 20. The supporting plate 300 may be fixedly coupled to the bottom wall 22 of the cooking chamber 20 when the front and rear edges 311 and 312 of the supporting plate body 310 are coupled to the bottom wall 22 of the cooking chamber 20. The left and right edges 313 and 314 of the supporting plate body 310 may be at a distance from an edge of the opening 22a directed to the left wall 23 of the cooking chamber 20 and the other edge of the opening 22a directed to the right wall 24 of the cooking chamber 20, so that the heated air generated from the second burner 50 may be moved.

The supporting plate 300 may further include a moving hole for heated air 320 formed toward the front of the cooking chamber 20. In other words, the moving hole for heated air 320 may be formed at the supporting plate body 310 for the heated air generated from the second burner 50 to be moved to the door 30. For example, the moving hole for heated air 320 may be formed at the supporting plate body 310 to be adjacent to the front edge 311 of the supporting plate body 310.

Specifically, the supporting plate 300 may include a plurality of moving holes for heated air 320. The plurality of moving holes for heated air 320 may be separately arranged in the left and right direction Y of the cooking chamber 20. Each of the plurality of moving holes for heated air 320 may have the form of almost a rectangle. Specifically, each moving hole for heated air 320 may have long sides 321 extending in the left and right direction Y of the cooking chamber 20 and short sides 322 extending in the front and back direction X of the cooking chamber 20 and connected to the long sides 321. The plurality of moving holes for heated air 320 may each have a particular size to prevent flames generated from the second burner 50 from passing the plurality of moving holes for heated air 320 and reaching the door 30 in the form of flames rather than heated air. For example, the plurality of moving holes for heated air 320 may have the long sides 321 ranging from approximately 50 mm to 55 mm and the short sides 322 ranging from approximately 10 mm to 15 mm. More specifically, the plurality of moving holes for heated air 320 may have the long sides 321 of approximately 53 mm and the short sides 322 of approximately 13 mm. However, the shape and size of the plurality of moving holes for heated air 320 are not limited thereto.

The supporting plate 300 may further include a flange 330 extending upward from the supporting plate body 310 to close the gap between the supporting plate 300 and the bottom plate 200. The flange 330 may include an extension 331 extending upward from the supporting plate body 310, and a bending portion 332 bending from the extension 331 to the outside of the supporting plate 300. Specifically, the flange 330 may include a front flange 330a formed to be directed to the front of the cooking chamber 20, and a rear flange 330b formed to be directed to the back of the cooking chamber 20. The front flange 330a may extend upward from the front edge 311 of the supporting plate body 310, and the rear flange 330b may extend upward from the rear edge 312 of the supporting plate body 310. The front flange 330a may be formed on the supporting plate body 310 not to block an outlet for heated air 500 (see FIG. 7) formed to supply the heated air generated from the second burner 50 to the door 30. The front flange 330a may include left and right flanges opposite each other with the outlet for heated air 500 between them in the left and right direction Y of the cooking chamber 20. In other words, the outlet for heated air 500 may be formed between the left and right flanges.

The oven 1 may further include a guide bracket 400 arranged between the bottom plate 200 and the supporting plate 300 for guiding the heated air that has passed the moving holes for heated air 320 to the outlet for heated air 500. The guide bracket 400 may prevent the heated air that has passed the moving holes for heated air 320 from staying between the bottom wall 22 of the cooking chamber 20 and the bottom plate 200. Furthermore, the guide bracket 400 may guide the heated air that has passed the moving holes for heated air 320 to the door 30, thereby expanding the cleaning area for self-cleaning function of the oven 1 not only to the cooking chamber 20 but also to the inside of the door 30 that defines cooking space with the cooking chamber 20.

The guide bracket 400 may be coupled to the supporting plate 300 to cover the moving holes for heated air 320.

Specifically, the guide bracket 400 may include a first portion 410 directed to the front of the cooking chamber 20, a second portion 420 directed to the back of the cooking chamber 20, and a third portion 430 connecting the first portion 410 and the second portion 420. The first portion 410 may be separated from the supporting plate 300 and directed to the outlet for heated air 500. The second portion 420 may be coupled to the supporting plate 300. Specifically, the second portion 420 may be fixedly coupled to the supporting plate body 310. The third portion 430 may include a slope 431 that faces the moving holes for heated air 320.

The first portion 410 of the guide bracket 400 may be placed above the second portion 420 of the guide bracket 400 in the up and down direction Z of the cooking chamber 20.

The heated air generated from the second burner 50 may pass the moving holes for heated air 320 and may be guided along the slope 431 of the third portion 430 of the guide bracket 400 to the door 30.

Figure 8:
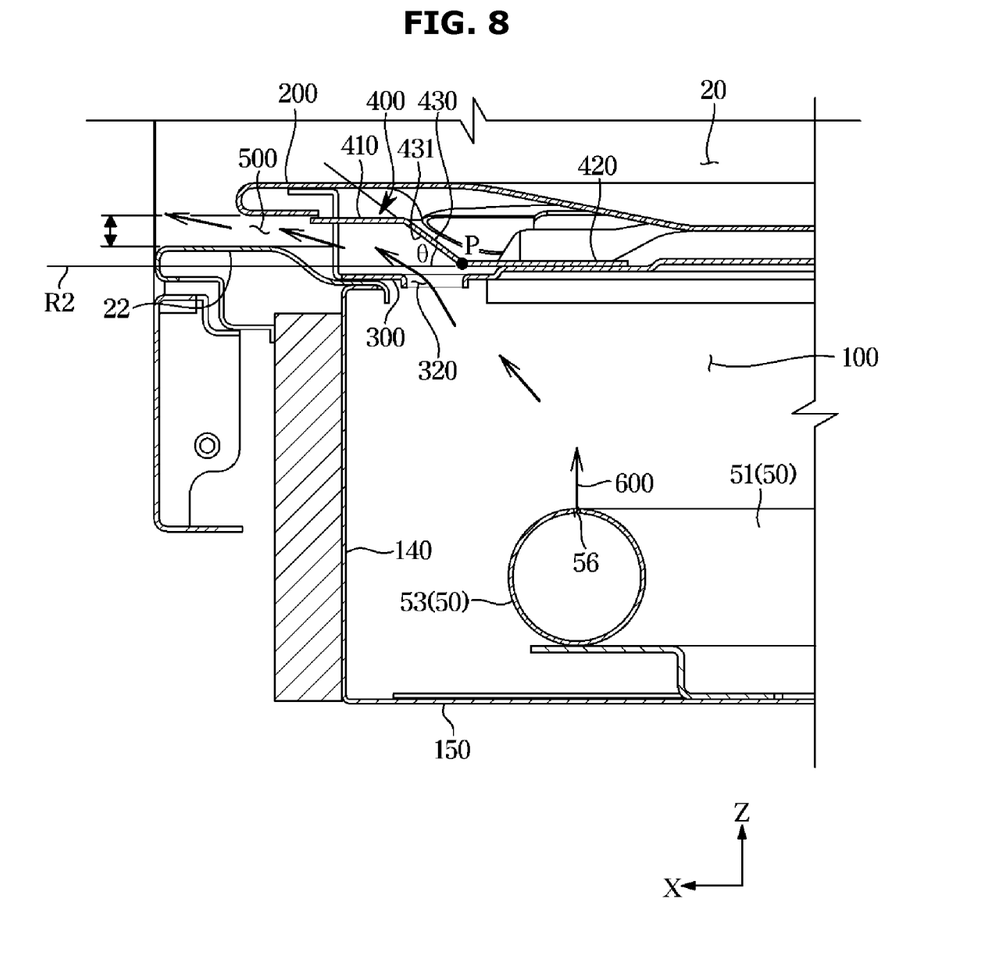
FIG. 8 is a cross-sectional view of part of an oven, according to an embodiment of the disclosure.

The slope 431 of the third portion 430 may be an angle of approximately 30 degrees or greater and approximately 40 degrees or less from a reference line R2 extending in the front and back direction X of the cooking chamber 20 to pass a point of contact between the second portion 420 and the third portion 430 (see FIG. 8).

The oven 1 may further include the outlet for heated air 500 (see FIG. 7) formed between an end of the bottom plate 200 facing the door 30 and the bottom wall 22 of the cooking chamber 20, for the heated air generated from the second burner 50 to be supplied to the door 30. In other words, the outlet for heated air 500 may be formed between the one end of the bottom plate 200 directed to the front of the cooking chamber 20 and the bottom wall 22 of the cooking chamber 20.

Figure 7:
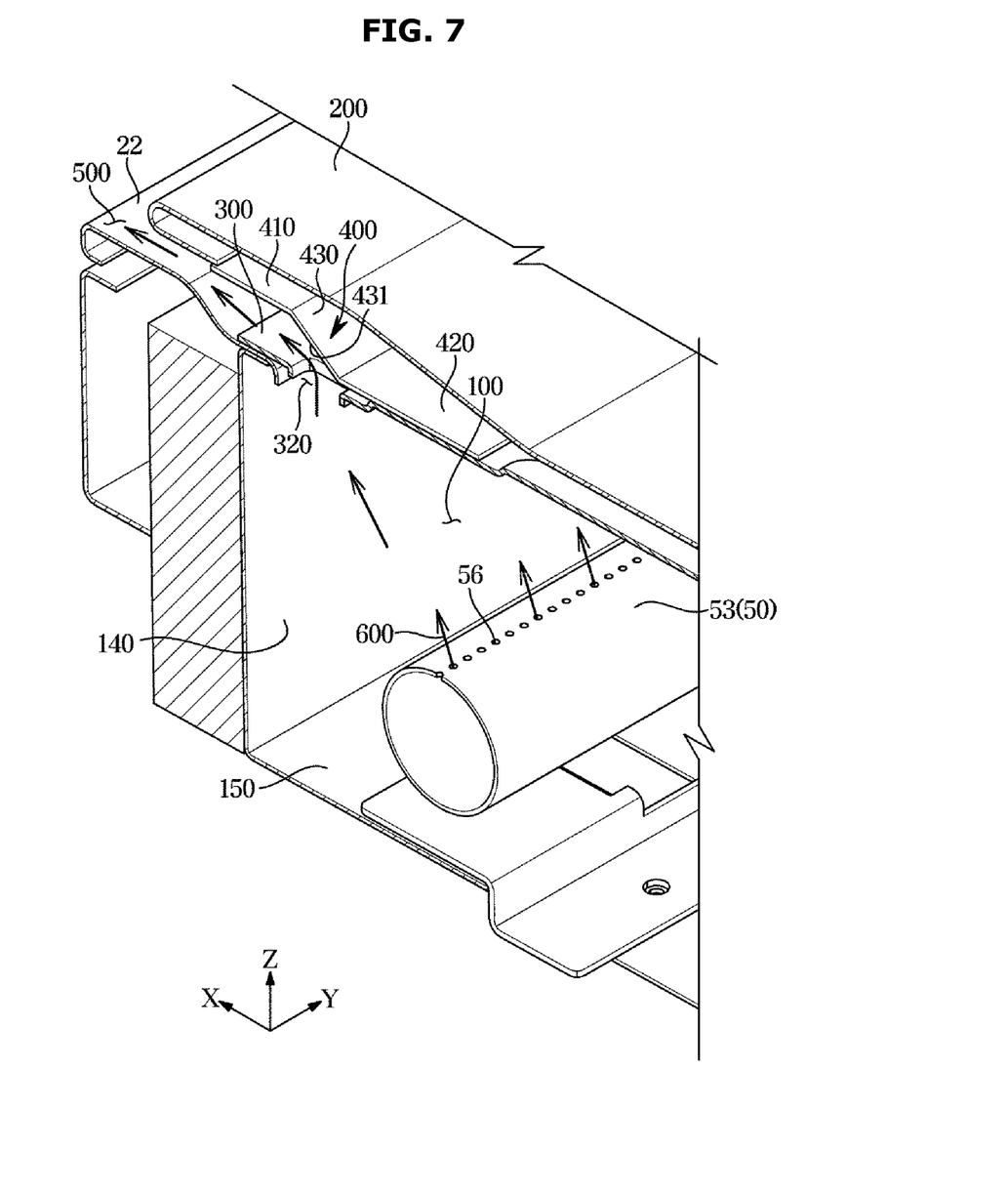
FIG. 7 shows circulation of heated air generated from a second burner of an oven, according to an embodiment of the disclosure.

The heated air generated from the second burner 50 may pass the moving holes for heated air 320 and may be guided by the guide bracket 400 to the front of the cooking chamber 20. The heated air guided by the guide bracket 400 to the front of the cooking chamber 20 may be released to the inside of the door 30 through the outlet for heated air 500. When the self-cleaning function is performed in the oven 1, the heated air released to the inside of the door 30 through the outlet for heated air 500 may burn contaminants spattered on the inside of the door 30.

A distance between the one end of the bottom plate 200 and the bottom wall 22 of the cooking chamber 20, which defines the outlet for heated air 500 may be in a range from approximately 6.9 mm to approximately 10 mm in the up and down direction Z of the cooking chamber 20. When the distance between the one end of the bottom plate 200 and the bottom wall 22 of the cooking chamber 20 that defines the outlet for heated air 500 is less than 6.9 mm, it is hard for the heated air generated from the second burner 50 to pass the outlet for heated air 500, thereby degrading the efficiency of the self-cleaning function of the oven 1. Furthermore, when the distance between the one end of the bottom plate 200 and the bottom wall 22 of the cooking chamber 20 that defines the outlet for heated air 500 is equal to or greater than 10 mm, it is not suitable because the flames generated from the second burner 50 might come out of the outlet for heated air 500 in the form of flames rather than heated air and thus excessively heat or burn the inside of the door 30.

The oven 1 may further include the second burner 50. The second burner 50 may be contained in the burner accommodation chamber 100.

The burner accommodation chamber 100 may include a rear wall 110 located under the rear wall 25 of the cooking chamber 20, a left wall 120 located under the left wall 23 of the cooking chamber 20, a right wall 130 located under the right wall 24 of the cooking chamber 20, a front wall 140 under the open front of the cooking chamber 20 (see FIG. 7), and a bottom wall 150 that forms the burner accommodation chamber 100 with the front wall 140, the rear wall 110, the left and right walls 120 and 130. The left and right walls 120 and 130 of the burner accommodation chamber 100 may include curved planes to guide the heated air generated from the second burner 50 to the cooking chamber 20.

The second burner 50 may include a first pipe 51 located near the left wall 120 of the burner accommodation wall 120, a second pipe 52 located near the right wall 130 of the burner accommodation wall 120 to be opposite the first pipe 51, and a third pipe 53 that connects the first and second pipes 51 and 52 and is located near the front wall 140 of the burner accommodation chamber 140. The third pipe 53 may be arranged to face the door 30. The second burner 50 may further include a fourth pipe 54 located between the first and second pipes 51 and 52 and connected to the third pipe 53. The first, second, and fourth pipes 51, 52, and 54 may extend in the front and back direction X of the cooking chamber 20. The third pipe 53 may extend in the left and right direction Y of the cooking chamber 20. For example, the second burner 50 may have the form of a trident. The form of the second burner 50 is not, however, limited thereto, but may be variously modified.

A plurality of first discharge holes 55 may be formed at the first and second pipes 51 and 52 for the heated air generated from the second burner 50 to be supplied to the side walls 23 and 24 of the cooking chamber 20 through the plurality of outlets for heated air 220. Specifically, some of the flames generated from the second burner 50 may be discharged from the first pipe 51 through the plurality of first discharge holes 55 of the first pipe 51. Heated air of the flames discharged from the first pipe 51 may be moved across the left wall 120 of the burner accommodation chamber 100 and supplied to the left wall 23 of the cooking chamber 20 through one of the plurality of outlets for heated air 220 of the bottom plate 200. Some other flames generated from the second burner 50 may be discharged from the second pipe 52 through the plurality of first discharge holes 55 of the second pipe 52. Heated air of the flames discharged from the second pipe 52 may be moved across the right wall 130 of the burner accommodation chamber 100 and supplied to the right wall 24 of the cooking chamber 20 through the other one of the plurality of outlets for heated air 220 of the bottom plate 200.

A plurality of second discharge holes 56 may be formed at the third pipe 53 for the heated air generated from the second burner 50 to be supplied to the door 30 through the outlet for heated air 500. The plurality of first discharge holes 55 and the plurality of second discharge holes 56 may be different in size. Specifically, the plurality of second discharge holes 56 may be smaller in size than the plurality of first discharge holes 55. Some other flames generated from the second burner 50 may be discharged from the third pipe 53 through the plurality of second discharge holes 56 of the third pipe 53. Heated air of the flames discharged from the third pipe 53 may pass the moving holes for heated air 320 of the supporting plate 300 and may be guided by the guide bracket 400 and released through the outlet for heated air 500. The heated air released through the outlet for heated air 500 may be supplied to the inside of the door 30.

FIG. 7 shows circulation of heated air generated from a second burner of an oven, according to an embodiment of the disclosure, and FIG. 8 is a cross-sectional view of part of an oven, according to an embodiment of the disclosure. FIGS. 7 and 8 show circulation of the heated air generated from the second burner 50 while the self-cleaning function is performed in the oven 1.

As shown in FIGS. 7 and 8, the oven 1 may further include a first heated air path 600 arranged for the heated air generated from the second burner 50 to be moved to the door 30. The first heated air path 600 may be arranged for the heated air generated from the second burner 50 to be discharged to the front of the cooking chamber 20 and supplied to the door 30. The first heated air path 600 may be formed to run from the third pipe 53 of the second burner 50 to the door 30.

Flows of heated air along the first heated air path 600 during operation of the self-cleaning function of the oven 1 will now be described.

Heated air of the flames discharged through the plurality of second discharge holes 56 of the third pipe 53 of the second burner 50 may pass the moving holes for heated air 320 of the supporting plate 300 and may be guided by the guide bracket 400. Specifically, the heated air that has passed the moving holes for heated air 320 of the supporting plate 300 may be guided along the slope 431 of the third portion 430 of the guide bracket 400 and released through the outlet for heated air 500 via the first portion 410 of the guide bracket 400. The heated air released to the outlet for heated air 500 may reach the inside of the door 30 and burn the contaminants spattered on the inside of the door 30.

Figure 9:
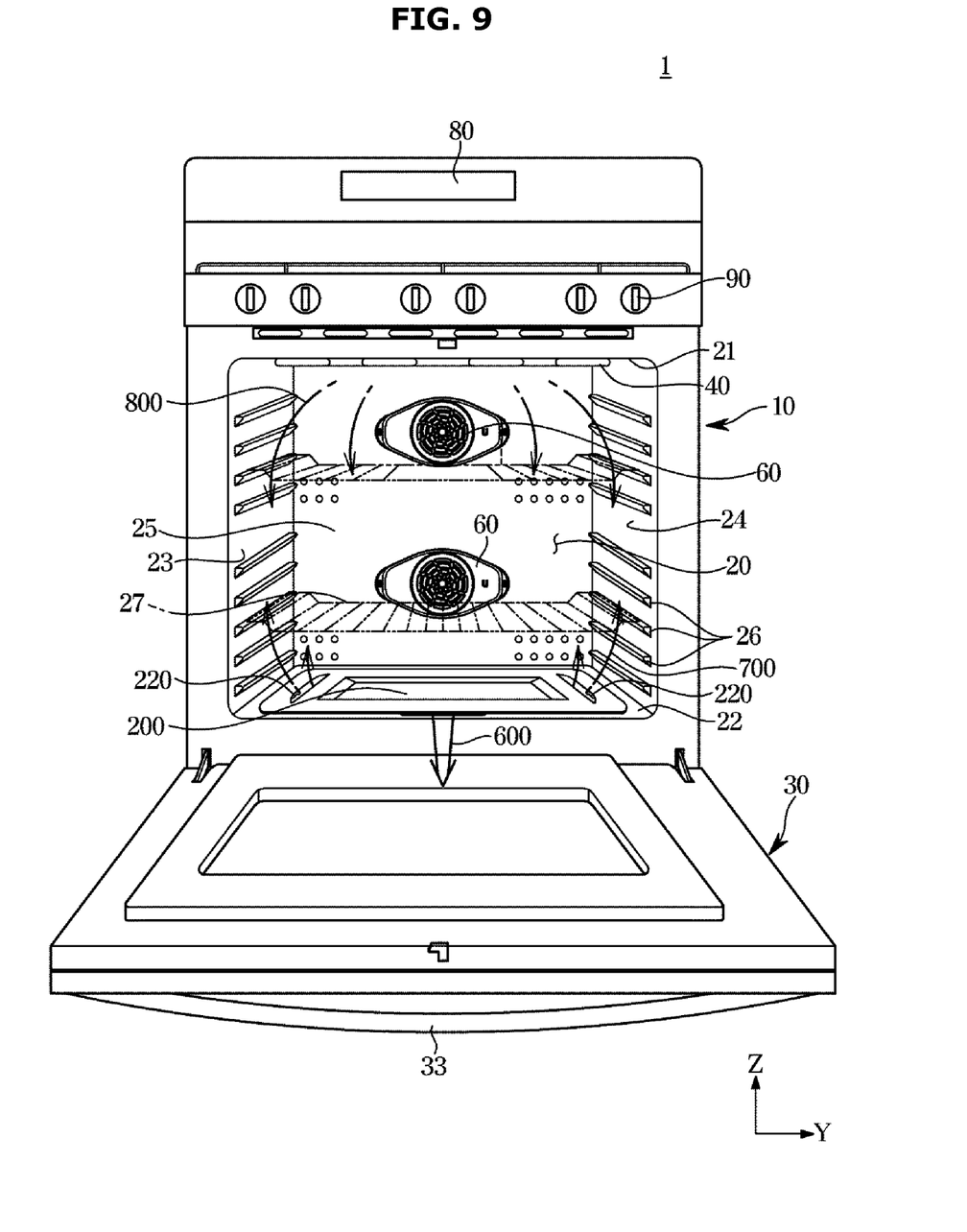
FIG. 9 shows circulation of heated air inside cooking space when a self-cleaning function of an oven is performed, according to an embodiment of the disclosure.

FIG. 9 shows circulation of heated air inside a cooking space when a self-cleaning function of an oven is performed, according to an embodiment of the disclosure.

As shown in FIG. 9, the oven 1 may further include a second heated air path 700 arranged for the heated air generated from the second burner 50 to be moved to the side walls 23 and 24 of the cooking chamber 20. The second heated air path 700 may be formed to run from the first pipe 51 of the second burner 50 to the left wall 23 of the cooking chamber 20. Furthermore, the second heated air path 700 may be formed to run from the second pipe 52 of the second burner 50 to the right wall 24 of the cooking chamber 20.

Heated air of the flames discharged through the plurality of first discharge holes 55 of the first pipe 51 of the second burner 50 may be released to the left wall 23 of the cooking chamber 20 through one of the plurality of outlets for heated air 220 of the bottom plate 200. The heated air reaching the left wall 23 of the cooking chamber 20 may burn contaminants spattered on the left wall 23 of the cooking chamber 20.

Heated air of the flames discharged through the plurality of first discharge holes 55 of the second pipe 52 of the second burner 50 may be released to the right wall 24 of the cooking chamber 20 through the other one of the plurality of outlets for heated air 220 of the bottom plate 200. The heated air reaching the right wall 24 of the cooking chamber 20 may burn contaminants spattered on the right wall 24 of the cooking chamber 20.

The oven 1 may further include a third heated air path 800 arranged for the heated air generated from the first burner 40 to circulate in the cooking chamber 20.

As described above, with the first heated air path 600 introduced to the oven 1, not only the cooking chamber 20 but also the inside of the door 30 that defines a cooking space with the cooking chamber 20 may be cleaned. Compared with the conventional oven whose cleaning effect of the self-cleaning function is limited to the cooking chamber and whose cleaning rate is as low as approximately 73.6%, the oven 1 having the first heated air path 600 according to the embodiment of the disclosure may obtain a result of cleaning the inside of the door 30 as well as the cooking chamber 20 and have a cleaning rate improved up to approximately 81.1%.

According to embodiments of the disclosure, an oven may clean its cooking chamber as well as the inside of a door that defines a cooking space with the cooking chamber in performing a self-cleaning function, by having a heated air path, along which heated air generated from a burner of the oven is moved, formed for the heated air to be released to the front of the cooking chamber and supplied to the door.

Several embodiments have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. An oven comprising:
   a main body;
   a cooking chamber formed inside the main body and including a bottom wall;
   a burner provided below the bottom wall of the cooking chamber and configured to generate heated air;
   a door arranged to open or close the cooking chamber;
   a bottom plate arranged above the bottom wall of the cooking chamber to cover the bottom wall of the cooking chamber and to be spaced apart from the bottom wall of the cooking chamber;
   an outlet formed between an end of the bottom plate facing the door and the bottom wall of the cooking chamber, to discharge the heated air generated from the burner is toward the door;
   a supporting plate coupled to the bottom wall of the cooking chamber, disposed between the bottom plate and the bottom wall, and including at least one moving hole formed at an end of the supporting plate facing the door to discharge the heated air therethrough and toward the outlet,
   a guide bracket provided between the bottom plate and the supporting plate and disposed in an air path formed between the at least one moving hole and the outlet to guide the heated air discharged from the at least one moving hole to the outlet.

2. The oven of claim 1, wherein the guide bracket is coupled to the supporting plate to cover the at least one moving hole.

3. The oven of claim 1, wherein the guide bracket comprises
   a first portion directed to the outlet and parallel to the bottom wall;
   a second portion coupled to the supporting plate; and
   a third portion connecting the first portion to the second portion and including a slope opposite the at least one moving hole.

4. The oven of claim 3, wherein the first portion is located in a position higher than the second portion.

5. The oven of claim 3, wherein the slope of the third portion includes an angle of approximately 30 degrees or greater and approximately 40 degrees or less relative to a horizontal line extending along a front to back direction of the cooking chamber to pass a point of contact between the second portion and the third portion.

6. The oven of claim 1, wherein a distance between the end of the bottom plate facing the door and the bottom wall of the cooking chamber, which defines the outlet for heated air, is greater than or equal to approximately 6.9 mm and less than approximately 10 mm in a vertical direction of the cooking chamber.

7. The oven of claim 1, wherein the at least one moving hole comprises a plurality of moving holes separately arranged along a left to right direction of the cooking chamber, each moving hole of the plurality of moving holes having long sides extending in the left to right direction of the cooking chamber and short sides extending in a front to back direction of the cooking chamber.

8. The oven of claim 1, further comprising:
   a plurality of main outlets formed to pass through the bottom plate such that the heated air generated from the burner is guided toward side walls of the cooking chamber through the plurality of main outlets.

9. The oven of claim 8, wherein:
   the bottom plate comprises
   a bottom plate body in which the plurality of main outlets are formed; and
   a border part formed along edges of the plurality of main outlets, and extending in a downward direction from the bottom plate body.

10. The oven of claim 9, wherein the border part of the bottom plate comprises
    a first border part extending downwardly from the perimeter of the plurality of main outlets; and
    a second border part opposite from the first border part, extending downwardly from the perimeter of the plurality of main outlets, and the first border part extended longer than the second border part.

11. The oven of claim 10, wherein the first border part includes an angle relative to a vertical line extending in a vertical direction of the cooking chamber.

12. The oven of claim 8, further comprising:
a burner accommodation chamber disposed below the bottom wall of the cooking chamber and configured to accommodate the burner therein,
wherein the burner comprises
a first pipe arranged to be adjacent to a first side wall of the burner accommodation chamber;
a second pipe arranged to be adjacent to a second side wall of the burner accommodation chamber opposite to the first side wall; and
a third pipe arranged to be adjacent to the door and connecting the first pipe to the second pipe,
wherein each of the first pipe and second pipe has a plurality of first discharge holes formed thereon to discharge the heated air generated from the burner toward the side walls of the cooking chamber through the plurality of main outlets, and
wherein the third pipe has a plurality of second discharge holes formed thereon to discharge the heated air generated from the burner toward the door through the outlet.

13. The oven of claim 12, wherein the plurality of second discharge holes are smaller in size than the plurality of first discharge holes.

14. The oven of claim 1, wherein the support plate further includes a plurality of protrusions extended in a downward direction from the support plate and the at least one moving hole is formed between the plurality of protrusions.

15. An oven comprising:
a main body;
a cooking chamber formed inside the main body and including a bottom wall;
a door arranged to open or close the cooking chamber;
a burner provided below the bottom wall of the cooking chamber and configured to generate heated air, and including a pipe facing the door;
a bottom plate arranged above the bottom wall of the cooking chamber to cover the bottom wall of the cooking chamber and to be spaced apart from the bottom wall of the cooking chamber;
a heated air path arranged for the heated air generated from the burner to be discharged toward the door therethrough;
an outlet formed between a front end of the bottom plate and a front end of the bottom wall of the cooking chamber to discharge the air from the burner toward the door, and located in the heated air path;
a supporting plate coupled to the bottom wall of the cooking chamber, disposed between the bottom plate and the bottom wall, and including at least one moving hole located in the heated air path, and formed at an end of the supporting plate facing the door to discharge the heated air therethrough and toward the outlet; and
a guide bracket provided between the bottom plate and the supporting plate and disposed in the heated air path formed between the at least one moving hole and the outlet to guide the heated air discharged from the at least one moving hole to the outlet.

16. The oven of claim 15, wherein the guide bracket comprises
a first portion directed to the front of the cooking chamber and parallel to the bottom wall;
a second portion directed to a back of the cooking chamber and coupled to the supporting plate; and
a third portion connecting the first portion to the second portion and including a slope opposite the at least one moving hole.

17. The oven of claim 15, wherein the support plate further includes a plurality of protrusions extended in a downward direction from the support plate and the at least one moving hole is formed between the plurality of protrusions.

* * * * *

UNITED STATES PATENT AND TRADEMARK OFFICE
CERTIFICATE OF CORRECTION

| | |
|---|---|
| PATENT NO. | : 11,466,867 B2 |
| APPLICATION NO. | : 16/720869 |
| DATED | : October 11, 2022 |
| INVENTOR(S) | : Tae Hun Kim et al. |

It is certified that error appears in the above-identified patent and that said Letters Patent is hereby corrected as shown below:

In the Claims

Column 12, Line 3:
In Claim 1, delete "chamber," and insert -- chamber --.

Column 12, Line 4:
In Claim 1, delete "burner is" and insert -- burner --.

Signed and Sealed this
Sixth Day of December, 2022

Katherine Kelly Vidal
*Director of the United States Patent and Trademark Office*